3,009,960
OXIDATION OF OLEFINS TO UNSATURATED ALDEHYDES
Adolph C. Shotts, Lake Charles, La., and Alfred H. Stephan, White Bear Lake, Minn., assignors, by mesne assignments, to Cities Service Research and Development Company, New York, N.Y., a corporation of New Jersey
No Drawing. Continuation of application Ser. No. 616,600, Oct. 18, 1956. This application Oct. 3, 1958, Ser. No. 765,050
9 Claims. (Cl. 260—604)

This invention relates to an improved process for the oxidation of olefins to unsaturated aldehydes and is a continuation of our co-pending application Serial No. 616,-600, filed October 18, 1956, and now abandoned.

Olefins have been oxidized in the prior art by methods which comprise reacting the olefin, such as propylene, with a gas containing molecular oxygen to form the corresponding aldehyde in which metal selenites and tellurites are used as catalysts. Although almost any metal selenite or tellurite may be used, silver selenite is preferred. The life of even the preferred catalyst is very limited. In fact, its catalytic activity decreases almost to zero in a very short time. The activity of such a catalyst may be improved by incorporating therein an oxide of copper, manganese, nickel, or zinc. When this is done, the activity of the catalyst decreases rapidly at first but not to zero and then more slowly. As a result, the catalyst containing the promoter remains active even though such activity is limited over a relatively long period of time. As an improvement in this process, it has been proposed (as for example U.S. Patent 2,670,379) to oxidize an olefin by passing the olefin vapors admixed with molecular oxygen over a copper containing catalyst in the presence of elementary selenium. The selenium can be introduced as vapor or produced in situ by decomposition of a decomposible selenite under the reaction conditions. While this latter process is rather efficient and good yields of the desired product can be obtained, the use of selenium is undesirable. Selenium is expensive, and its vapors are toxic which makes it imperative that the selenium be recovered virtually completely from the effluent gases before they are discharged to the atmosphere. Since selenium is not readily removed from the effluent gases by use of solvents, or agents, such as alkalis, acids, or oxidizing agents, resort to special techniques must be made which add considerably to the cost of operation.

It is, therefore, a principal object of the present invention to provide a process which obviates the disadvantages of the prior art processes. It is another object of our invention to provide the process for the oxidation of olefins to unsaturated aldehydes utilizing a catalyst which will maintain its activity over long periods of time. It is a further object of the present invention to provide a catalyst for the oxidation of olefins to unsaturated aldehydes which is low in cost and does not have objectionable toxic characteristics.

These and other objects and advantages of the present process will be apparent as the invention is hereinafter more fully described.

To the accomplishment of the foregoing and related ends, this invention then comprises the features hereinafter fully described and particularly pointed out in the claims, the following description setting forth in detail certain illustrative embodiments of the invention. These features are indicative, however, of but a few of the various ways in which the principle of the invention may be employed.

Broadly stated, the present invention comprises a method whereby an olefin of the general formula

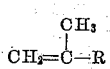

wherein the R is selected from the group consisting of hydrogen and alkyl radicals is passed over a copper silicate catalyst admixed with molecular oxygen and, in the presence of sulfur, whereby the olefin is oxidized to the corresponding unsaturated aldehyde.

Before proceeding with the specific example illustrating our invention, it may be well to indicate in general the types of compounds required in the process.

Olefins that may be oxidized to the corresponding aldehyde include propylene, isobutylene, 2-methyl butene-1, 2-methyl pentene-1, 2,3-dimethyl butene-1, 2-methyl hexene-1, 2,3,3-trimethyl butene-1, and 2-methyl heptene-1.

The solid contact catalyst which may be used is preferably a mass containing as a catalytic substance copper silicate. The catalytic substance may be distributed upon carriers, such as pumice, asbestos, silica gell, and alumina, in order to obtain a large area of active surface or the catalytic substance may be used in the form of pellets.

The sulfur acting in conjunction with the contact catalyst may be added to the mixture of gaseous reactants in the form of vapor; or it may be generated in situ by the decomposition of decomposable sulfides which may be present in the catalytic substances described above. Suitable sulfides include those of copper, silver, antimony, bismuth, and iron. When the sulfur is supplied in the form of vapor admixed with the gaseous reactants, it is expedient to pass part or the whole of the olefin-oxygen mixture or even part or the whole of the olefins only over the heated sulfur. By adjusting the temperature at which the gas or the gas mixture is passed over the sulfur and/or by regulating the amount of gas passed over the sulfur, the amount of sulfur in the gas mixture may be regulated.

When sulfur is added in the vapor form to the gaseous reactants, its amount can vary within wide limits and depends to a certain extent on the nature of the contact catalyst used and the olefin to be oxidized. Thus, to oxidize isobutylene, there may be used from about 0.01 to about 2.0 grams of sulfur per 100 liters of a gas mixture containing 2 percent by volume of isobutylene. More than 2.0 grams may be used, but the reaction then becomes complicated by the formation of sulfur containing compounds resulting from the reaction of isobutylene and methacrolein with sulfur dioxide. The preferred range of sulfur concentration is from about 0.1 to about 1.0 gram of sulfur per 100 liters of gas containing 2 percent isobutylene measured under standard conditions.

The molecular oxygen containing gas that may be used in process of this invention may be air, air fortified with oxygen, or oxygen. The molecular oxygen containing gas may be diluted with inert gases such as, for example, carbox dioxide, nitrogen, or steam.

Diluents such as carbon dioxide and steam have the added advantages that they can readily be removed from the effluent gas stream by scrubbing or condensation.

The ratio of oxygen to olefin that may be used varies over a wide range. Thus, from about 0.01 to 100 parts of air per part of olefin may be used; however, since the olefins form explosive mixtures with gases, it is probably advisable to avoid certain concentrations. With air and olefin mixtures, the explosive range is from 7 to 70 parts of air per part of olefin. Therefore, ranges free from the hazard of explosions that may be used in the process of this invention are from about 0.01 to 7 parts of air per part of olefin and from 70 to 100 parts of air per part of olefin. With air and propylene mixtures, the explosive range is from 8 to 49 parts of air per part of propylene; and with air and isobutylene mixtures, the explosive range is from 9 to 60 parts of air per part of isobutylene. In general, the higher the molecular weight of the olefin, the broader is the explosive range. For oxygen containing gas mixtures containing higher concentrations of oxygen than air, the explosive range is broader than the range for air; and for mixtures containing lower concentrations of oxygen than air, the range is narrower.

The oxidation reaction of this invention may be carried out under reduced pressure or at super-atmospheric pressures. The preferred pressures are from atmospheric to 2 or 3 atmospheres. In general, the explosive range as described above for olefin-oxygen containing gases is narrower for reduced pressures and broader for elevated pressures.

The temperature range in which the oxidation reaction of this invention may be carried out is from about 180° to 400° C., preferably from 275° to 350° C.

The unsaturated aldehydes produced by the oxidation reaction may be recovered from the reaction mixture in any suitable way, for instance, by scrubbing with a solvent or by cooling. The scrubbed gas mixture may be allowed to go to waste, particularly when it contains only a small percentage of olefin or it may be replenished with olefin and oxygen and recycled.

In order to disclose the nature of the present invention still more clearly, the following illustrative examples will be given. It is to be understood that the invention is not to be limited to the specific conditions or details set forth in these examples except insofar as such limitations are specified in the appended claims. Parts where used are parts by weight.

Example 1

A solution of 242 parts of $Cu(NO_3)_2 \cdot 3H_2O$ dissolved in 1,000 parts of water was slowly added to a solution of 142 parts of sodium metasilicate, $Na_2SiO_3 \cdot 9H_2O$ in 2,000 parts of water while stirring the mixture rapidly. The light blue precipitate which was produced was filtered, drained dry, and dried at 100° C. The product was further heated in a stream of air for 1½ hours at 300° C., machine pelleted (5/32" x 1/16"), and activated by heating at 600° C. for 1 hour.

A U-shaped reactor tube of Pyrex glass having a 9 mm. bore and a length of 35 cm. was charged with 20 g. of catalyst pellets and heated in a liquid bath at 320° C. A 10 liter per hour stream of an air-isobutylene mixture containing 2 percent of isobutylene (1 part isobutylene to 49 parts air) was divided into two streams, one stream of which was passed through a vessel containing molten sulfur heated at such a temperature that 0.009 g. per hour of sulfur volatilized. The two streams were then combined and passed into the reactor tube. The exit gases from the reactor tube were scrubbed with water to remove methacrolein. After 24 hours, it was found that 13.0 percent of the isobutylene feed had been converted to methacrolein and 2.0 percent to carbon dioxide.

Example 2

Example 1 was repeated with the exception that no sulfur was introduced into the system. After 24 hours, it was found that 1.0 percent of the isobutylene had been converted to methacrolein and 0.5 percent to carbon dioxide.

Example 3

Example 1 was repeated with the exception that 0.1 g. of sulfur was introduced into the system instead of 0.009 g. of sulfur. After 24 hours, it was found that 16.7 percent of the isobutylene had been converted to methacrolein and 2.5 percent to carbon dioxide.

Example 4

Example 1 was repeated except that propylene was used instead of isobutylene. It was found that 15 percent of the propylene had been converted to acrolein and 3 percent carbon dioxide.

Example 5

Example 4 was repeated except no sulfur was used in the reaction. Less than 2 percent of the propylene was converted to acrolein and 1 percent to carbon dioxide.

Example 6

Vapors of 2-methylbutene-1 were mixed with air to give a gaseous feed containing 98 percent air and 2 percent olefin. This feed was passed over molten sulfur and then over copper silicate pellets at a rate of 10 liters/hour. The reactor was held at 320° C. A total of 0.03 gram sulfur per hour was evaporated. It was found that 10 percent of the 2-methylbutene-1 was converted to α-ethylacrolein and 3 percent to carbon dioxide.

Example 7

Example 6 was repeated except no sulfur was introduced into the system. Only 1 percent of the 2-methylbutene-1 was converted to α-ethylacrolein and 2 percent to carbon dioxide.

Similar results were obtained when cupric, silver, antimony, and ferric sulfides were each substituted for elementary sulfur. When these decomposable sulfides were used, they were added to the copper catalyst.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

We claim:

1. A process for the preparation of alkyl substituted acroleins which comprises passing an olefin of the general formula:

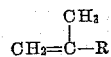

wherein R is selected from the group consisting of hydrogen and alkyl radicals of 1 to 5 carbons in the vapor phase admixed with oxygen over copper silicate as a catalyst at a temperature within the range of 180 to 400° C., and in the presence of sulfur as a promoter.

2. A process for the preparation of alkyl substituted acroleins which comprises passing an olefin of the general formula:

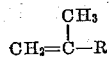

wherein R is selected from the group consisting of hydrogen and alkyl radicals of 1 to 5 carbons in the vapor phase admixed with oxygen over copper silicate as a catalyst at a temperature within the range of 275 to 350° C., and in the presence of sulfur as a promoter.

3. The process of claim 1 wherein the oxygen-olefin weight ratio varies from 0.01:1 to 7:1.

4. The process of claim 1 wherein the oxygen-olefin weight ratio varies from 70:1 to 100:1.

5. The process of claim wherein the amount of said promoter incorporated in said reaction mixture is an amount varying from 0.01 to 2.0 grams per 2 liters of olefin said olefin measured under standard conditions.

6. The process of claim 1 wherein the amount of said promoter incorporated in said reaction mixture is an amount varying from 0.1 to 1.0 grams per 2 liters of olefin said olefin measured under standard conditions.

7. The process of claim 1 wherein the olefin is isobutylene.

8. The process of claim 1 wherein the olefin is propylene.

9. The process of claim 1 wherein the olefin is 2-methylbutene-1.

References Cited in the file of this patent

UNITED STATES PATENTS

| | | |
|---|---|---|
| 2,807,647 | Cheney et al. | Sept. 24, 1957 |

FOREIGN PATENTS

| | | |
|---|---|---|
| 527,167 | Canada | July 3, 1956 |
| 658,179 | Great Britain | Oct. 3, 1951 |

UNITED STATES PATENT OFFICE
CERTIFICATE OF CORRECTION

Patent No. 3,009,960 November 21, 1961

Adolph C. Shotts et al.

It is hereby certified that error appears in the above numbered patent requiring correction and that the said Letters Patent should read as corrected below.

Column 5, line 1, after "claim" insert -- 1 --.

Signed and sealed this 29th day of May 1962.

(SEAL)
Attest:

ERNEST W. SWIDER
Attesting Officer

DAVID L. LADD
Commissioner of Patents